United States Patent [19]
Haga

[11] Patent Number: 6,058,224
[45] Date of Patent: May 2, 2000

[54] MANUAL SCANNING TYPE IMAGE INPUT DEVICE AND IMAGE SIGNAL PROCESSING METHOD USING THINNED OUT LINE IMAGE DATA

[75] Inventor: Hiroshi Haga, Tokyo, Japan

[73] Assignee: NEC Corporation, Tokyo, Japan

[21] Appl. No.: 08/982,392

[22] Filed: Dec. 2, 1997

[30] Foreign Application Priority Data

Dec. 2, 1996 [JP] Japan .................................. 8-321962

[51] Int. Cl.⁷ ..................................................... H04N 1/40
[52] U.S. Cl. ........................... 382/313; 358/473; 358/474
[58] Field of Search ................................... 358/473, 474, 358/486, 496, 497, 451, 444, 448, 505, 506; 382/313–315; H04N 1/40

[56] References Cited

U.S. PATENT DOCUMENTS

| | | | |
|---|---|---|---|
| 4,851,921 | 7/1989 | Sato et al. ................................. | 358/474 |
| 4,866,535 | 9/1989 | Kubota et al. ........................... | 358/474 |
| 5,317,417 | 5/1994 | Yamamura et al. ..................... | 358/451 |
| 5,684,601 | 11/1997 | Endo ........................................ | 358/298 |
| 5,883,729 | 3/1999 | Miyazawa ................................ | 358/506 |

FOREIGN PATENT DOCUMENTS

5-129068 8/1982 Japan .

*Primary Examiner*—Kim Yen Vu
*Attorney, Agent, or Firm*—Sughrue, Mion, Zinn, Macpeak & Seas, PLLC

[57] ABSTRACT

In a manual scanning type image input apparatus and an image signal processing method, unevenness of scanning is hard to occur due to the simple constitution. A line image sensor reads an image data of prescribed manuscript while implementing electrical main scanning with predetermined driving cycle, before a movement distance encoder detects movement distance in the direction of mechanical auxiliary scanning. A line image data which is read by the line image sensor is distributed to either one of two systems to be stored temporarily in the line memory of the two systems. The line image data which is stored temporarily is read out selectively by a data selector, before being constructed as an image data based on an address of the selected line image data by decoder. The line memory temporarily stores the whole line image data outputted from the line image sensor, before reading out the line image data while thinning out thereof based on the movement distance in the direction of mechanical auxiliary scanning whereby it becomes capable of constructing the image data of the manuscript without unevenness based on the mechanical auxiliary scanning of equal velocity.

10 Claims, 9 Drawing Sheets

FRAME MEMORY
1048576byte

MANUAL SCANNING TYPE IMAGE INPUT DEVICE AND IMAGE SIGNAL PROCESSING METHOD USING THINNED OUT LINE IMAGE DATA

BACKGROUND OF THE INVENTION

The present invention relates to a manual scanning type image input device and image signal processing method which has a characteristic read operation in the direction of mechanical auxiliary scanning. Namely, a line memory temporarily stores the whole line image data outputted from a line image sensor, before reading out the lessened line image data of the whole line image data while thinning out thereof.

DESCRIPTION OF THE PRIOR ART

A conventional manual scanning type image input apparatus and image signal processing method as a first conventional example is disclosed, which apparatus is generally constituted that a line image sensor implements an electrical main scanning, and it causes the image sensor and a manuscript to be moved relatively in the direction of mechanical auxiliary scanning, so that the electrical main scanning and the mechanical auxiliary scanning are implemented, thus an image information of the manuscript and a corresponding image information are acquired. In this constitution, in order to store an image information of the manuscript in the condition that there is no distortion in respect of the image, it is necessary to be retained both of scanning velocity in the direction of electrical main scanning and scanning velocity in the direction of mechanical auxiliary scanning within the prescribed value due to the scanning criterion applied to the apparatus.

Since fluctuation of the scanning velocity in the direction of the mechanical auxiliary scanning exists in as fluctuation of scanning line interval of a stored image, it inspires unevenness of resolution in the direction of the mechanical auxiliary scanning of the stored image, thus coming to be one primary factor causing image quality of the stored image to deteriorate. In particular, when the mechanical auxiliary scanning is implemented manually, in ordinary circumstances, a big fluctuation comes into being in the mechanical auxiliary scanning velocity.

It is always necessary to set a scanning line interval to be constant in the stored image, even if the fluctuation of the scanning velocity occurs in the direction of the mechanical auxiliary scanning. It is proposed when the image information is stored in the memory, writing data into the memory corresponding to data of one scanning line of the line image sensor is implemented whenever relative movement distance in the direction of the mechanical auxiliary scanning between the manuscript and the line image sensor arrive at prescribed required distance.

The conventional scanning type image input apparatus has a movement distance encoding circuit which generates a signal whenever the relative movement distance between the manuscript and the line image sensor in the direction of mechanical auxiliary scanning arrives at the prescribed distance predetermined in the system. The image information of one scanning line in the line image sensor is stored in the memory due to the signal generated by the movement distance encoding circuit. If the movement distance encoding circuit is applied to the apparatus, the stored image data becomes an image without unevenness of resolution, even if the mechanical auxiliary scanning velocity is fluctuated in the case where the vertical scanning is implemented manually.

The above described movement distance encoder consists of a rotating disc provided with optical pattern formed by marking or slit, which disc rotates in accordance with movement in the direction of manual mechanical auxiliary scanning, a photosensor composed of combination between photo detector and a light-emitting device, for reading the optical pattern and a waveform shaping circuit for shaping waveform of the photosensor. However, in the movement distance encoder, it is necessary to provide slits or marks of R pieces/mm thereof in order to set resolution in the direction of the mechanical auxiliary scanning to R lines/mm.

When forming frequency of the slits or the marks is relatively small which slits or marks are optical patterns should be provided for the rotating disc in the peripheral direction, forming of optical patterns to the rotating disc is capable of implementing relatively easy and with high accuracy, in cases where resolution is low in the direction of mechanical auxiliary scanning of manual mechanical scanning type image input apparatus, or large diameter of rotating disc is capable of being used.

However when the resolution is highly determined for example, such as eight lines/mm in the direction of mechanical auxiliary scanning of the manual mechanical auxiliary scanning type image input apparatus, and when it is required that it causes the size of rotating disc to make smaller for the purpose of miniaturization of the manual scanning type image input apparatus, the forming frequency of slits or marks becomes extremely high for slits or marks which should be provided in the peripheral direction of the rotating disc. In this case, it is very difficult to provide the optical patterns accurately for the rotating disc. Further excellent performance is required in connection with the photosensor in use for reading optical patterns provided for the rotating disc. It came to be clear, there were these problems in terms of the movement distance encoder.

In order to resolve these problems, the second conventional example was proposed as the Japanese Patent Application Laid-Open No. SHO 57-129068. The apparatus of the second conventional example comprises a movement distance encoder with resolution of one line/mm in the direction of mechanical auxiliary scanning, and a control circuit including variable frequency oscillator which is controlled synchronously with output signal from the movement distance encoding circuit so as to be able to oscillate N times frequency of the repetitive frequency of the output signal from the movement distance encoding circuit. By virtue of this constitution, read operation is started in every scanning line of the line image sensor due to the signal based on the output signal from the variable frequency oscillator. Thereby, there is disclosed starting time control method of read operation of the line image sensor of the manual mechanical auxiliary scanning type read apparatus.

Figure 1:
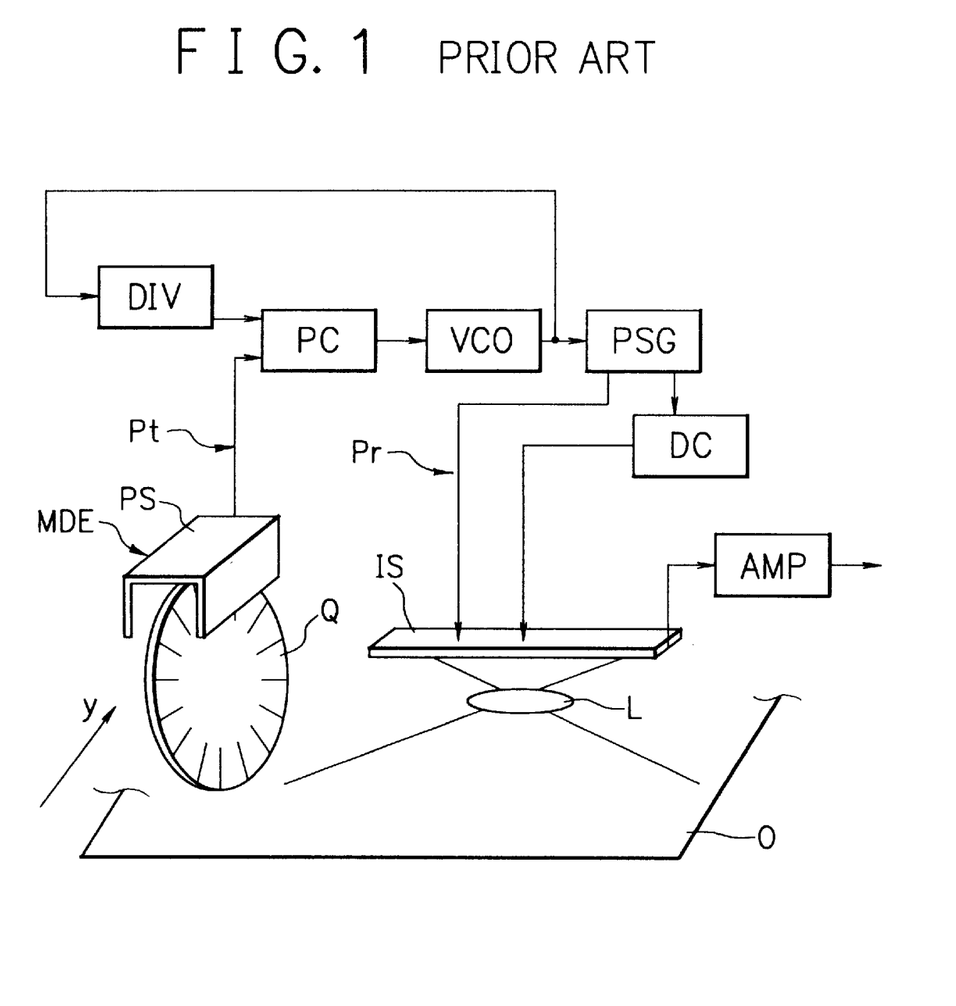
FIG. 1 is a view showing an example of conventional constitution of a movement distance encoder.

FIG. 1 is a block diagram showing technology of the above second conventional example. In FIG. 1, "O" is a manuscript whose image information is to be read by a manual scanning type image input apparatus. The image information of the manuscript "O" is imaged on a photoelectric conversion section of the line image sensor (IS) through an image optical system L, thus the image information of the manuscript is converted into quantity of electricity corresponding to the image information in the photoelectric conversion section. In answer to the above image information, the pulse Pr for reading is applied to the line image sensor (IS) so that the quantity of electricity generated at the photoelectric conversion section is transferred to a transmission section of the line image sensor. The line image sensor (IS) is driven by driving pulse outputted from a driving circuit (DC), thus outputting the image signal so that the image signal is inputted to an amplifier (AMP).

In the manual scanning type image input apparatus, mechanical auxiliary scanning is implemented manually in the direction of the arrow y in FIG. 1. In the mechanical auxiliary scanning, a movement distance encoding circuit (MDE) provided at the manual scanning type image input apparatus generates a movement distance encoding signal Pt in every movement of the manual mechanical auxiliary scanning type image input apparatus which moves predetermined distance in the direction of the arrow y of the mechanical auxiliary scanning so that the movement distance encoding circuit (MDE) applies the movement distance encoding signal Pt to a phase comparator (PC).

The movement distance encoding circuit (MDE) shown in FIG. 1 consists of a rotating disc Q and a photosensor (PS). The slits or the marks which are optical patterns set to the rotating disc Q in the peripheral direction, whose mutual interval in the periphery direction is of N times the normal dimension.

An output of the phase comparator (PC) is applied to a voltage-controlled oscillator (VCO) with frequency of N times repetitive frequency of the movement distance encoding pulse Pt as a freerunning frequency. The output of the voltage-controlled oscillator (VCO) is applied both to a frequency divider (DIV) and a pulse generator (PSG). The frequency divider (DIV) divides an oscillation wave of the voltage-controlled oscillator (VCO) into 1/N thereof to input to the phase comparator (PC). Due to the constitution, the oscillation wave of the voltage-controlled oscillator (VCO) is synchronized with the output signal Pt from the movement distance encoding circuit (MDE) and has N times frequency of repetitive frequency of the movement distance encoding pulse Pt.

Figure 2A:
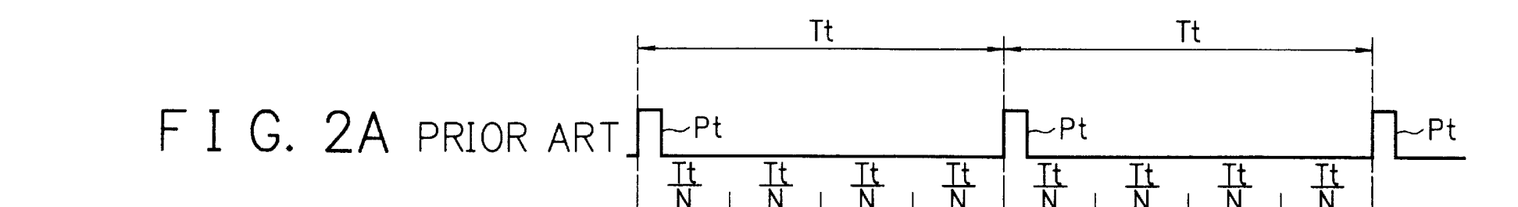
Figures 2B, 2C:
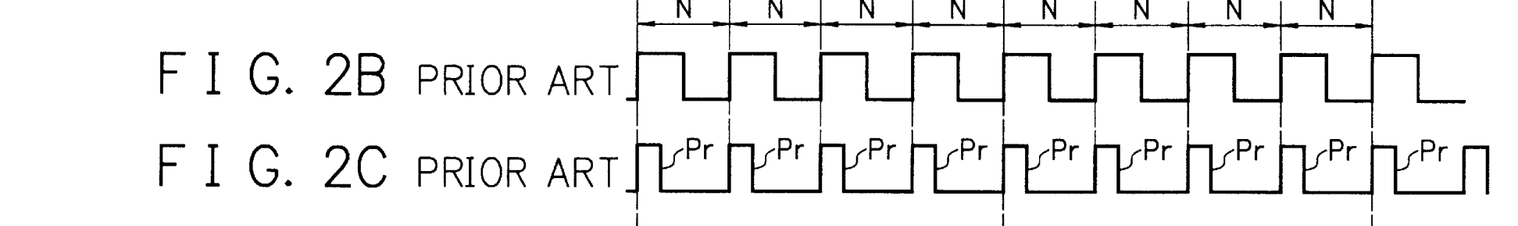
FIG. 2B shows a oscillation wave (N=4) of the voltage-controlled oscillator (VCO)
FIG. 2C shows a waveform of read operation starting pulse Pr.
Figure 2D:
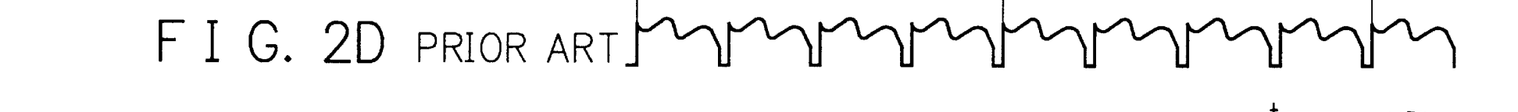
FIG. 2D shows waveform of output signal from the line image signal.

FIGS. 2A to 2D are waveform view showing operation thereof. FIG. 2A shows a waveform of the movement distance encoding pulse Pt. FIG. 2B shows an oscillation wave (N=4) of the voltage-controlled oscillator (VCO). FIG. 2C shows a waveform of read operation starting pulse Pr. FIG. 2D shows waveform of output signal from the line image signal. Tt shows cycle.

In FIGS. 2A to 2D, the oscillation wave of the voltage-controlled oscillator (VCO) shown in FIG. 2B is applied to the line image sensor (IS) as the read operation starting pulse Pr of the line image sensor (IS) in the pulse generator (PSG) shown in FIG. 2C, thus the image signal shown in FIG. 2D corresponding to image information of the manuscript "O" is generated from the line image sensor (IS).

Thus, in the second conventional example, the apparatus which has resolution of one line/mm is used in the direction of the mechanical auxiliary scanning of the movement distance encoding circuit, and which is constituted such that it is capable of oscillating N times frequency of the repetitive frequency of the output signal from the movement distance encoding circuit. The read operation comes to be started due to the signal obtained by this constitution in every scanning line of the line image sensor. It is intended to resolve the problems that superior performance of the photosensor is required for reading the optical patterns set to the rotating disc and that optical pattern is set to periphery of the rotating disc very accurately.

A circuit shown in the second conventional example, causes the output signal Pt from the movement distance encoding circuit (MDE) to set to input, and outputting N times frequency of the repetitive frequency of the movement distance encoding pulse Pt which is synchronized with the N times frequency. The circuit is generally known as a frequency synthesizer using phase-locked loop (PLL).

In FIG. 1, when there is no signal from the phase comparator (PC), the voltage-controlled oscillator (VCO) oscillates in peculiar oscillation frequency (freerunning oscillation frequency) f0 to output it. Frequency f0/N divided at the frequency divider into 1/N is applied to the phase comparator (PC). At this condition, when a frequency Pt very close to f0/N is inputted, the phase comparator (PC) outputs error signal in proportion to phase difference to output to the voltage-controlled oscillator (VCO). The error signal causes f0 to change in the direction that the error signal gets smaller. Thus it causes f0/N to agree with Pt in the frequency of the voltage-controlled oscillator (VCO). The locking of the phase locked loop means that f0/N is agreed with Pt. The phase locked loop (PLL) which is locked once follows change of Pt. A lock-range means variable region of the frequency Pt in which the phase locked loop (PLL) is capable of maintaining locking to Pt. A cap-range is frequency region of Pt in which the phase locked loop (PLL) is capable of catching a reference signal Pt to be locked. It is known that the cap-range is always narrower than the lock-range.

Figures 3A, 3B:
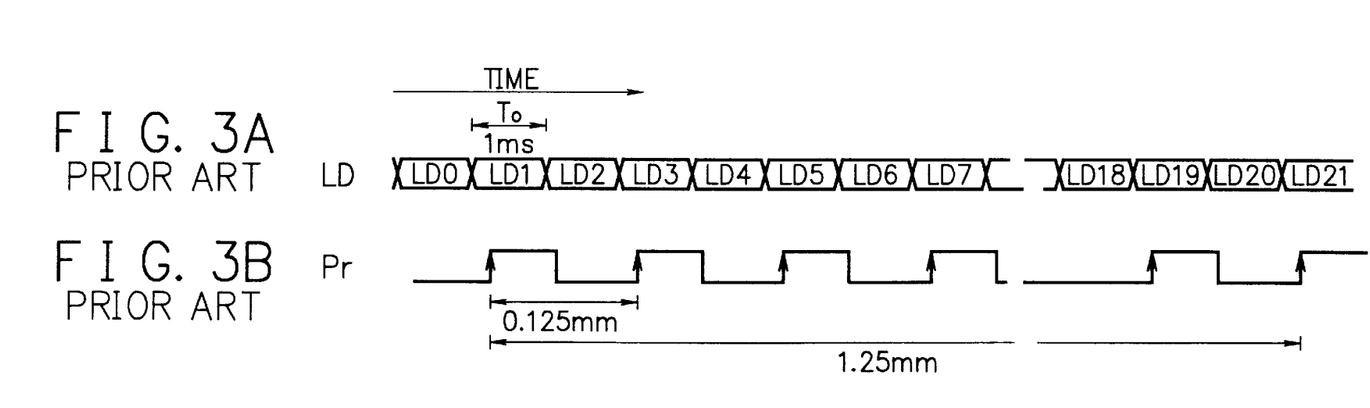
FIGS. 3A and 3B are timing charts of the conventional image scanning of FIG. 1.
Figure 4:
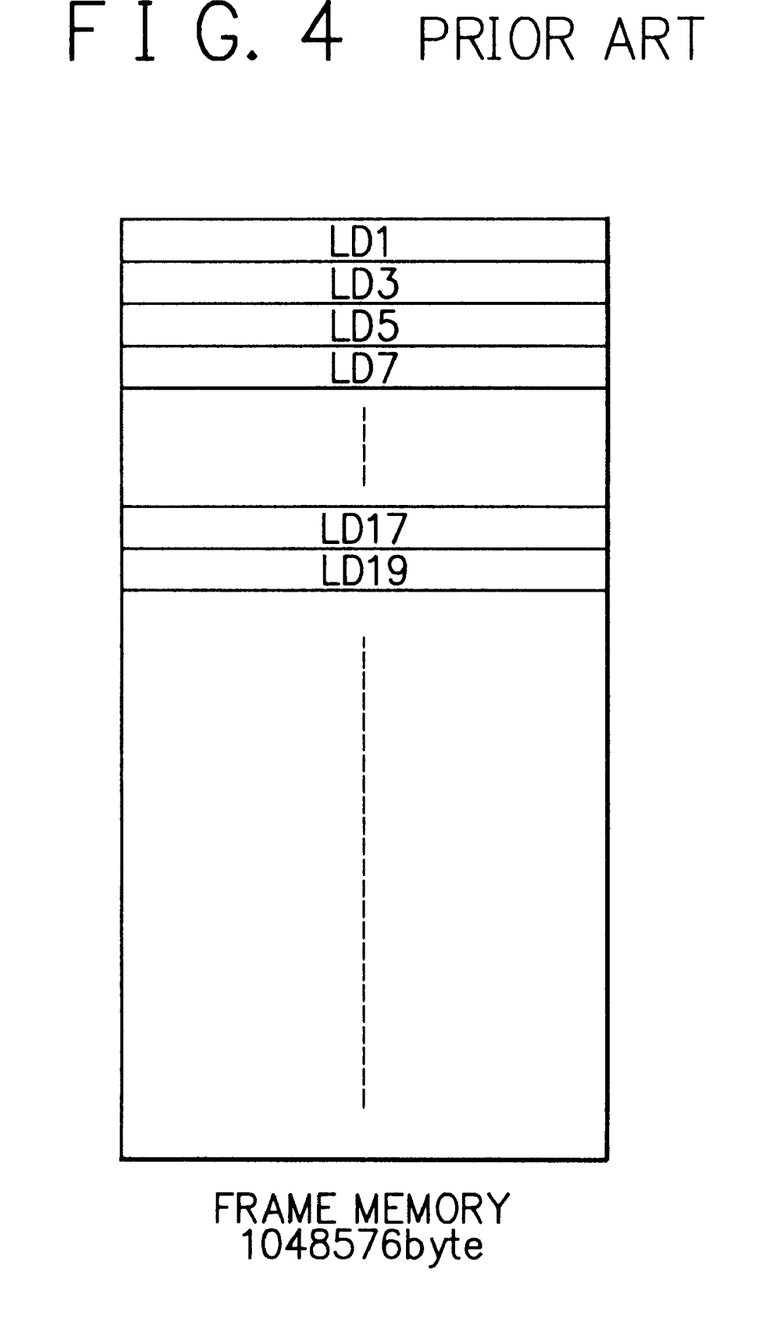
FIG. 4 is a view showing a constitution example of image data writing to the conventional frame memory.

FIGS. 3A, 3B and 4 are views showing schematic constitution example of pulse Pr generated by the moving distance encoder of the second conventional example. FIGS. 3A and 3B are timing charts of image scanning. FIG. 4 is a view showing a read constitution example of image data to a frame memory (FM) of 1048576 byte.

However, the first problem of the second conventional example is caused by the cap-range. In FIGS. 2A to 2D, the phase locked loop (PLL) is already locked. Respective waveforms are synchronized with the output waveform Pt of the voltage-controlled oscillator (VCO) as shown in FIG. 2B, and they come to be N times frequency of the output waveform Pt to be operated stably. However, in the manual mechanical auxiliary scanning type image input apparatus, when manual scanning is implemented, output Pt of the movement distance encoder is not outputted, because the rotating disc is not rotated before start of manual scanning or immediately after thereof. Subsequently, the manual scanning increases velocity, further the manual scanning velocity is maintained with fluctuation thereof to terminate the manual scanning. In order to cause the phase-locked loop (PLL) to lock, it causes the signal Pt to be Pt≈f0/N to generate so as to put the signal Pt within the cap-range of the phase locked loop.

In the second conventional example, the freerunning oscillation frequency f0 of the voltage-controlled oscillator (VCO) is selected to Se N times the Pt. There is no description in connection with the cap-range with the exception thereof. It is incapable of determining the freerunning oscillation frequency f0 in accordance with the second conventional example, because the pulse Pt is determined by the manual scanning. When the freerunning oscillation frequency f0 is determined randomly, the phase locked loop (PLL) is not locked unless it causes the pulse Pt to be Pt≈f0/N to generate, therefore, velocity of the manual mechanical auxiliary scanning immediately after start of the manual scanning is strictly restricted. Originally, simplicity is predicated of the manual mechanical auxiliary scanning type image input apparatus. However, under these circumstances the simplicity is remarkably hurt.

The second problem of the second conventional example is caused by the lock-range of the phase-locked loop (PLL). Even if the first problem is overcome, namely, the phase-locked loop (PLL) is capable of being locked, when the cycle Tt of the pulse Pt is fluctuated, there is a problem that it deviates from the lock-range. In recent years, the manual mechanical auxiliary scanning velocity of the manual scanning type image input apparatus is improved with the advance of technology of image sensor, driving thereof, and signal processing. The manual mechanical auxiliary scanning velocity reaches a maximum velocity of 6 cm/s, or further 12 cm/s. Even if the manual mechanical auxiliary scanning type image input apparatus possesses such scanning velocity, when it is intended to implement prudent input, it is required that it causes the manual mechanical auxiliary scanning to implement with low velocity in a degree of 2 cm/s. The mechanical auxiliary scanning velocity becomes naturally low velocity at immediately after start of the manual mechanical auxiliary scanning or just before termination thereof. In this case, the cycle Tt of the cycle Pt of the pulse Pt is accompanied with a degree of from three times to six times the fluctuation, thus deviating from the lock-range. It is incapable of implementing the processing method of the second conventional example, because there is no description in terms of the lock-range.

The problems to be solved by the present invention are the problems which the above second conventional example possess. As described in the second conventional example, when the resolution in the direction of the mechanical auxiliary scanning is highly determined, it is extremely difficult to set optical patterns to rotating disc, and it requires superior performance of the photosensor in use for reading the optical patterns set to the rotating disc.

SUMMARY OF THE INVENTION

In view of the foregoing, it is an object of the present invention for resolving the above-mentioned problems to provide a manual scanning type image input apparatus and image signal processing method in which unevenness of scanning is hard to occur in spite of the simple constitution.

According to a first aspect of the present invention, for achieving the above-mentioned object, there is provided a manual scanning type image input apparatus which comprises a line image sensor for reading image data of a prescribed manuscript while implementing electrical main scanning with predetermined driving cycle, a movement distance encoding means for detecting movement distance in the direction of mechanical auxiliary scanning of the line image sensor, a line memory for storing temporarily line image data which is read by the line image sensor, a data selector connected to the line memory for reading selectively the line image data which is stored temporarily, and a decoder for constructing image data based on an address of the line image data from the line image data selected by the data selector, wherein the image data of the required manuscript is constructed in such a way that the line memory temporarily stores therein the whole line image data outputted from the line image sensor, before the data selector reads out the line image data which is stored therein while thinning out the stored line image data based on the movement distance quantity.

According to a second aspect of the present invention there is provided a manual scanning type image input apparatus which comprises a distribution means for distributing the line image data which is read by the line image sensor to either one of two systems, wherein the line memory is constituted by one set including two memories each of which is connected to either one of the two systems to store the line image data temporarily.

According to a third aspect of the present invention, there is provided a manual scanning type image input apparatus wherein when said image data which is constructed requires resolution of R-line/mm in the direction of the mechanical auxiliary scanning, said movement distance encoding means possesses resolution of R/N-line/mm, thus setting the image data which is thinned out to read to N lines image data with equal interval.

According to a fourth aspect of the present invention, there is provided a manual scanning type image input apparatus wherein when new detection does not occur within predetermined time period in the movement distance encoding means, it implements termination processing of the reading.

According to a fifth aspect of the present invention, there is provided an image signal processing method which comprises the steps of a line image data reading step for reading an image data of a prescribed manuscript while implementing electrical main scanning with predetermined driving cycle, a movement distance detecting step for detecting a movement distance in the direction of mechanical auxiliary scanning of the line image sensor, a storing step for storing temporarily line image data which is read by the line image sensor, a selective reading step for reading selectively the line image data which is stored therein temporarily, and an image data constructing step for constructing image data based on an address of the line image data from the line image data selected by the data selector, wherein the image data of the required manuscript is constructed in such a way that it stores temporarily the whole line image data read by said line image data reading step, before selective reading step reads out the line image data which is stored therein while thinning out the stored line image data based on the movement distance quantity.

According to a sixth aspect of the present invention, there is provided an image signal processing method which further comprises the steps of a distribution step for distributing the line image data which is read at the line image data reading step to either one of two systems, wherein the storing step stores the line image data which is distributed in respective the two systems temporarily.

According to a seventh aspect of the present invention, there is provided an image signal processing method, wherein when the image data which is to be constructed requires resolution of R-line/mm in the direction of the mechanical auxiliary scanning, the movement distance encoding step is executed of resolution of R/N-line/mm, thus setting the image data which is thinned out to read to N lines image data with equal interval.

According to a eighth aspect of the present invention, there is provided an image signal processing method, wherein when new detection does not occur within predetermined time period in the movement distance encoding step, it implements termination processing of said reading.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIGS. 2A to 2D are wave form view showing operation of the conventional movement distance encoder of FIG. 1, FIG.

2A shows a waveform of the movement distant encoding pulse Pt.

DETAILED DESCRIPTION OF THE PREFERRED EMBODIMENTS

A preferred embodiment of manual scanning type image input apparatus and image signal processing method according to the present invention will now be described in detail referring to the accompanying drawings. In FIGS. 5 to 9, one embodiment of the manual scanning type image input apparatus and the image signal processing method according to the present invention is shown.

Hereinafter, the manual scanning type image input apparatus and image signal processing method will be explained using one example in which resolution of a line image sensor is 200 dpi (0.125 mm/dot), line cycle of the line image sensor T0=1 msec, read width of the line image sensor is 108 mm (864 pixel), wherein image data which is analog/digital converted with 1 byte/pixel is inputted.

Fundamental Embodiment

Figure 5:
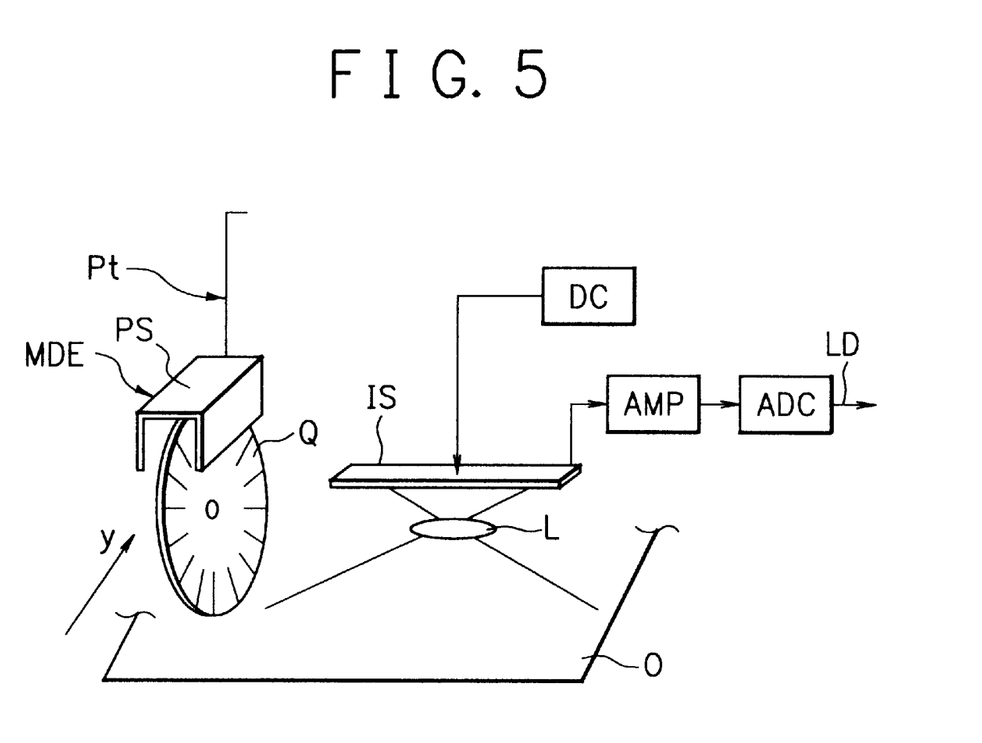
FIG. 5 is a view showing a constitution example of a movement distance encoder applied to one embodiment of a manual scanning type image input apparatus and an image signal processing method according to the present invention.
Figure 6A:
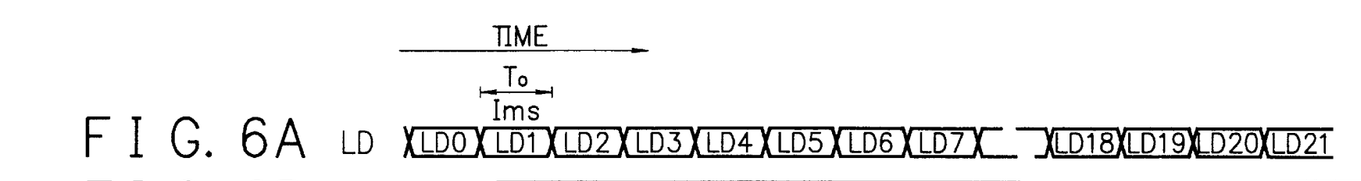
FIG. 6 is a timing chart of FIG. 5.
Figure 6B:
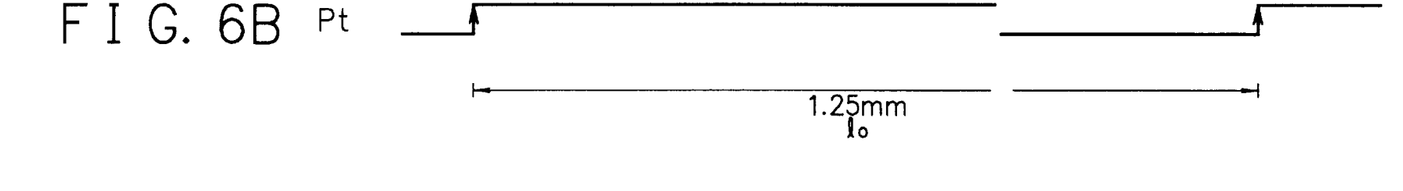
Figure 7:
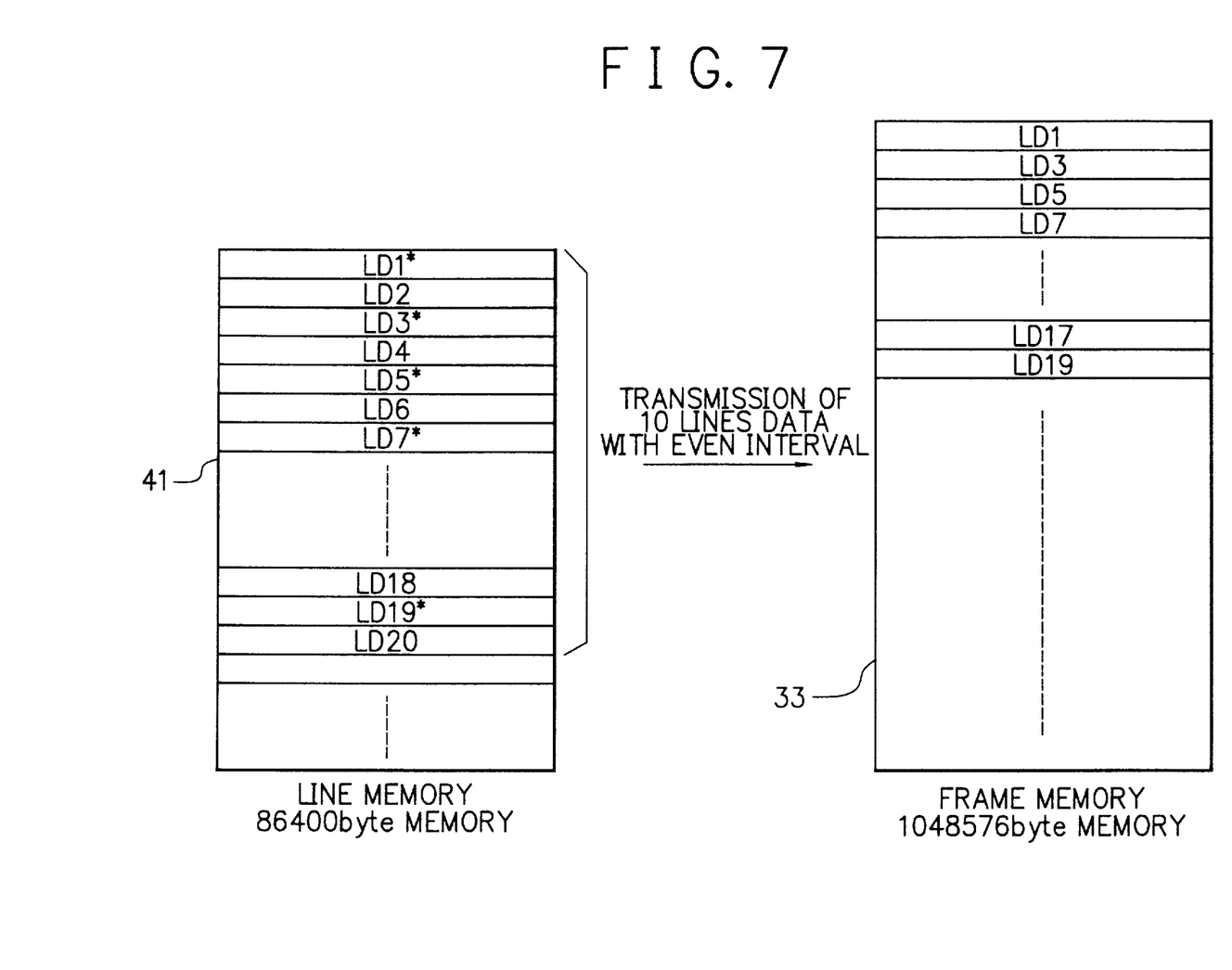
FIG. 7 is a view showing a constitution example of writing of image data in cases where line data is transferred in every ten lines with even interval.
Figure 8:
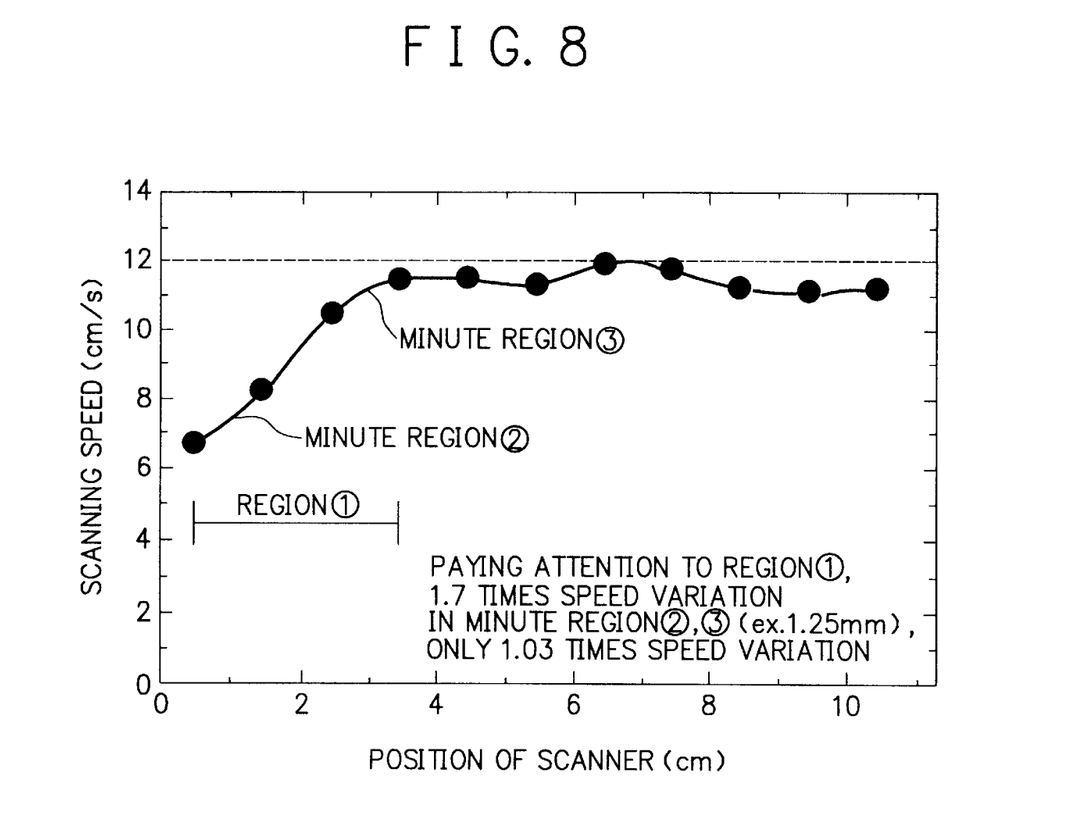
FIG. 8 is a view showing velocity variation example of manual mechanical auxiliary scanning in the relation between position of scanner and scanning velocity.

FIGS. 5 to 7 show fundamental constitution of the manual scanning type image input apparatus and image signal processing method according to the present invention. These drawings give an outline of constitutional example of pulse Pt generated by a movement distance encoder (MDE) 11 according to the embodiment. FIG. 5 shows constitution of the movement distance encoder. FIG. 6 is a timing chart thereof. FIG. 7 shows a constitution example of writing of the image data in cases where the line data is transferred from the line memory of 86400 bytes to the frame memory of 1048576 bytes in every 10 lines with even interval. The frequency of pulse Pt generated by the movement distance encoder (MDE) 11 is 0.8 pulse/mm (one pulse in every 1.25 mm). The frequency of pulse Pt generated by the movement distance encoder (MDE) 11 according to the present example is $\frac{1}{10}$ in comparison with the above described conventional example.

In FIGS. 5 to 7, respective line data LD1, LD2, . . . comes to be data of one scanning line which is read by the line image sensor (IS) 34 with one time of electrical main scanning. The data of one scanning line consists of data of 864 pieces of pixel and data during blank-period. The line data of one scanning line is outputted at line cycle T0=1 ms of the line sensor, this data is stored sequentialy in the line memory (LM) 41 from leading of pulse Pt of the movement distance encoding circuit. All of the data is stored successively in the line memory (LM) from a leading of the pulse Pt of the movement distance encoding circuit. A memory with capacity of 86400 byte is used as the line memory (LM) 41 such that data of 100 lines is capable of being stored. The line memory is switched to the next line memory at a leading of next pulse Pt.

A manual mechanical auxiliary scanning of ten lines=1.25 mm is implemented during a leading of a pulse Pt of this movement distance encoding circuit to a leading of a next pulse Pt thereof. On this account, for example, when scanning velocity is 62 mm/s, the following 20 lines of line data (17280 byte) are stored in the line memory 41.

$$(1.25[mm]/62[mm/s]) \div (1 \times 10^{-3}[s/line]) = 20.16$$

Output pulse number of the movement distance encoding circuit (MDE) 11 is reduced to $\frac{1}{10}$ of the conventional output pulse number. The manual mechanical auxiliary scanning in the direction of the mechanical auxiliary scanning is implemented to correspond to distance of 10 lines during the period of one pulse of the movement distance encoding circuit. The apparatus reads out 10 lines data (LD1, LD3, . . . , LD19), from the memory with equal interval to transfer the 10 lines data from the memory to a frame memory (FM) 33. The output data of the sensor (LD21, LD22, . . . ) outputted during the calculation and the transferring are stored in the next line memory which is switched.

In the above example of operation, 20 lines data (17280 byte) are quantized to be stored in the line memory. The line data number to be stored increases or decreases dependent on the scanning velocity. The apparatus reads out 10 lines data with equal interval among the line data which are fluctuated, thus transferring to the frame memory 33.

When this operation is repeated in every leading of the pulse Pt of the movement distance encoding circuit, image data of 200 dpi is also acquired in the direction of mechanical auxiliary scanning. In the vicinity of minute region ② of FIG. 8, 17 lines data (14688 byte) are stored in the line memory 41, and in the vicinity of minute region ③ of FIG. 8, 11 lines data (8640 byte) are stored in the line memory 41, therefore it is proper to read out 10 lines data thereof.

In this embodiment, a lower limit value of the manual mechanical auxiliary scanning velocity comes to be stipulated. Upper limit thereof is determined due to the line driving cycle of the sensor, that is the same method as the conventional method. In this embodiment, the upper limit is 12.5 cm/sec. The lower limit value is stipulated by a capacity of the line memory 41, for example, when capacity of line memory 41 is 86400 byte, the lower limit comes to be 1.25 mm/sec which is $\frac{1}{10}$ the upper limit. When the mechanical auxiliary scanning is implemented by the velocity less than the velocity of lower limit value, the capacity of the line memory exceeds own limit value before next output of the movement distance encoding circuit. However, if it causes a rough manual scanning velocity to instruct to the user beforehand, the lower limit value does not come to be less than 1.25 mm/sec. Rather, the lower limit value is capable of being utilized as the means for detecting termination of manual scanning. It was impossible to detect termination of manual scanning in the conventional method. In this embodiment, when there is no pulse output Pt during 0.1 sec which is the time when the capacity of line memory 86400 byte is full, it is capable of being judged as termination of the manual vertical scanning.

More Detailed Embodiment

Figure 9:
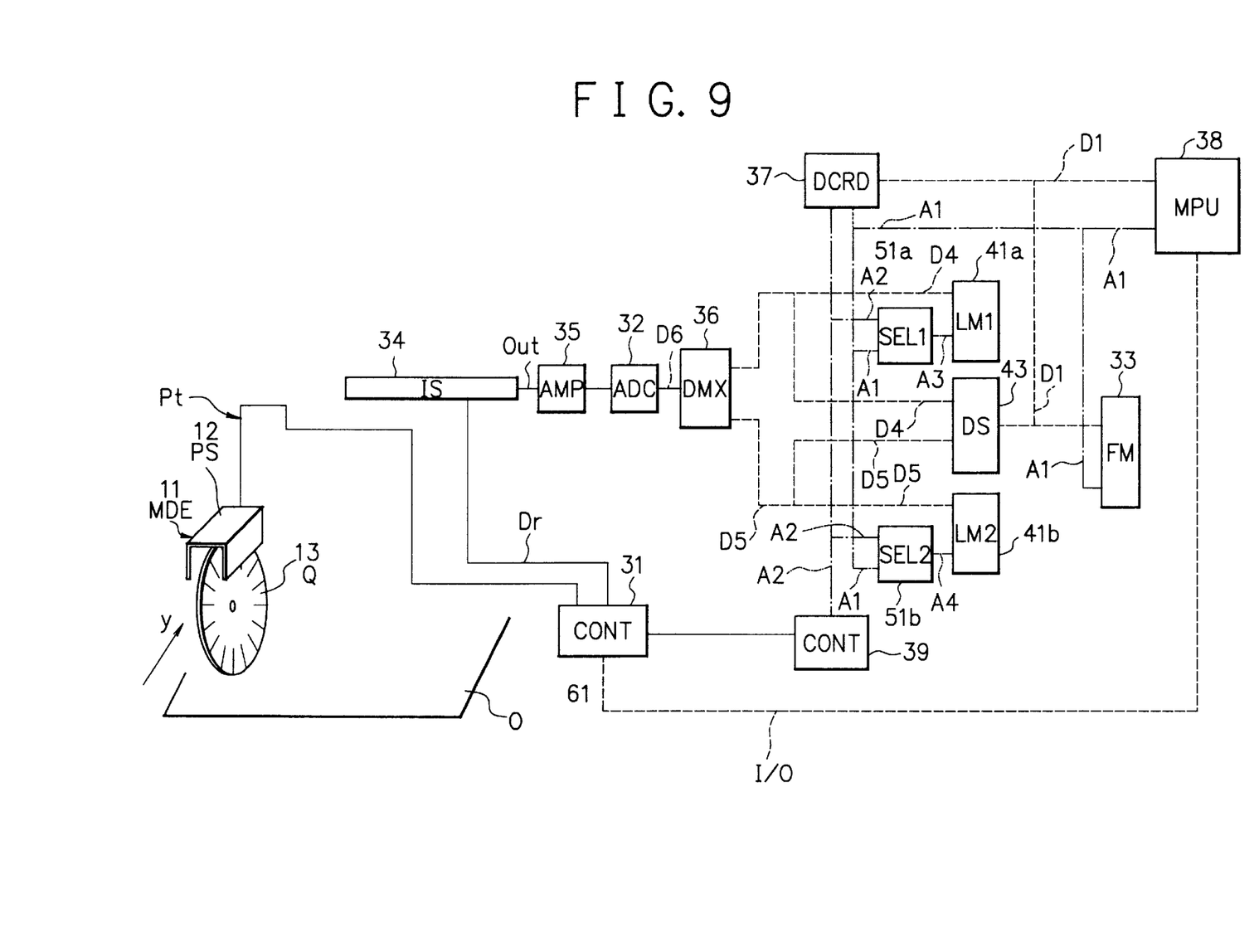
FIG. 9 is a block diagram showing in detail a manual scanning type image input apparatus.

FIG. 9 is a block diagram showing in detail above described manual scanning type image input device. More in detail, the embodiment will now be explained referring to FIG. 9. Main constitutional elements of the image input apparatus shown in FIG. 9 comprise a movement distance encoder (MDE) 11, a line image sensor (IS) 34, two line memories (LM1, LM2) for storing output data of the line image sensor (IS) 34 temporarily, one frame memory (FM1) for storing image data, and a microprocessor unit (MPU) 38 for controlling these elements.

The movement distance encoder (MDE) 11 comprises a rotating disc (Q) 13 provided with optical marks (slits or patterns) with frequency of 1/N the conventional frequency, a photosensor (PS) 12 for reading the optical marks, a waveform shaping circuit for causing the output of photosensor 12 to binarize to be converted to pulse signal. The pulse signal is inputted to a control circuit (CONT) 31.

An image sensor (IS) 34 is connected to a control circuit (CONT) 31 through a signal line (Dr), to which image sensor 34 a driving signal or electric power from power source is supplied. The image sensor (IS) 34 is connected to an amplifier (AMP) 35 through a signal line (Out), thus an output of the image sensor 34 is applied to the amplifier (AMP) 35. The output of the image sensor (IS) 34 is amplified to necessary level, before being subjected to analog-digital conversion by an analog-digital converter (ADC) 32. The analog-digital converter (ADC) 32 is connected to a signal demultiplexer (DMX) 36, thus data which is digitized by the analog-digital converter (ADC) 32 is applied to the signal demultiplexer (DMX) 36. The signal demultiplexer (DMX) 36 has a function to output an input data from a data line (D6) to only either a data line (D4) or a data line (D5). The selection is implemented by a control line (not illustrated) connected to the signal demultiplexer (DMX) 36.

A side (data line (D4) or data line (D5)) in which output of the data from the data line (D6) is not selected is maintained high impedance. The output line (D4) of the signal demultiplexer (DMX) 36 is connected to the data line of the line memory 1 (LM1) 41a and the data selector (DS) 43. The output line (D5) of the signal demultiplexer (DMX) 36 is connected to a line memory 2 (LM2) 41b and a data selector (DS) 43. The data selector (DS) 43 selects either data inputted from the data line (D4) or data inputted from the data line (D5), thus possessing function to output to the data line (D1). The data selector (DS) 43 has control terminal (not illustrated) for selecting thereof. The data line (D1) is connected to a frame memory (FM) 33, a microprocessor unit (MPU) 38 and a decoder (DCRD) 37.

The microprocessor unit (MPU) 38 is connected to the control circuit (CONT) 31 through an I/O line 61, thus input-output of the necessary control code is implemented. An address bus (A1) of the microprocessor unit (MPU) 38 is connected to a data selector 1 (SEL 1) 51a, a data selector 2 (SEL2) 51b, and the frame memory (FM) 33. An address counter (COUNT) 39 is connected to the selector 1 (SEL1) 51a and the selector 2 (SEL2) 51b through the address line (A2), thus output from the address counter (COUNT) 39 is applied to the selector (SEL1) 51a and the selector (SEL2) 51b through the address line (A2). Respective selector 1 (SEL1) and selector 2 (SEL2) selects either address line (A1) or address line (A2), thus outputting to address line (A3) or address line (A4). The address lines (A3, A4) are connected to address terminals of the line memories (LM1, LM2) respectively. With respect to the decoder (DCRD) 37 shown in the drawing, which decoder (DCRD) 37 outputs the address data of the address line (A2) to the data line (D1) only when the address allocated to the decoder (DCRD) 37 is outputted to the address line (A1).

Next, operation of the image input apparatus of constitution shown in FIG. 9 will now be explained.

Concrete numerical value is the same as that of already described embodiment. Namely, there is one example in which resolution of a line image sensor is 200 dpi (0.125 mm/dot), line cycle of the line image sensor T0=1 msec, read width of the line image sensor is 108 mm (864 pixel), wherein image data which is subjected to the analog-digital conversion by the analog-digital converter with 1 byte/pixel is inputted.

An image inputting is started such that the manual mechanical auxiliary scanning is started, then the movement distance encoding circuit outputs an initial pulse Pt, before writing the output data of the line image sensor 34 to the line memory 1 (LM1) 41a. The signal demultiplexer (DMX) 36 selects the data line (D4), the selector (SEL1) 51a selects the address line (A2), the selector (SEL2) 51b selects the address line (A1), and data selector (DS) 43 selects the data line (D5), before the movement distance encoding circuit outputs the first pulse. Further, the address counter (COUNT) 39 repeats count of 0 to 863 which count is synchronized with the output data of pixel, thus repeating a writing which is corresponding to the one line data to the line memory 1 (LM1) 41a. However, during blanking period of the line image sensor 34, the count is stopped temporarily, thus data during blanking period is not written. The control that data is not written during blanking period is implemented similarly after this.

When the initial pulse Pt from the movement distance encoding circuit is inputted to the control circuit (CONT) 31, the address counter (COUNT) 39 implements the count after 864 uninterruptedly without returning to "0" next to 863. Further the line data from the line image sensor 34 is written to the line memory 1 (LM1) continuously synchronized with the output of the line image sensor 34 such that the address data passes through the address lines (A2 and A3), while the image data passes through the data lines (D6) and (D4).

When the movement distance encoding circuit generates the second pulse before memory capacity of the line memory 1 (LM1) is filled up, writing of output data of the line image sensor 34 is switched from the line memory 1 (LM1) to the line memory 2 (LM2), thus transmission of N lines data from the line memory 1 (LM1) to the frame memory (FM) 33 starts. Namely, interruption occurs on the microprocessor unit (MPU) 38 when the second pulse is inputted, based on this operation the circuit is switched. Thus the signal demultiplexer (DMX) 36 selects the data line (D5), the selector 1 (SEL1) selects the address line (A1), the selector 2 (SEL2) selects the address line (A2), and the data selector (DS) 43 selects the data line (D4). Further the address counter 39 is returned to "0", thus the count synchronized with the driving of the line image sensor 34 is started. Furthermore, the value of the address counter 39 is taken in the microprocessor unit (MPU) 38 through the address line (A2) and the data line (D1) immediately after the interrupt signal occurs. The microprocessor unit (MPU) 38 determines line number (S) written in the line memory (LM1), and extracting interval is determined by an expression mentioned below, thus transferring the line data written in the line memory (LM1) with high velocity to the frame memory 33 by N lines data in every K lines data.

$$K = S \div N \ldots R$$

At this time the data lines (D4 and D1), and the address line (A1) are used. Also while this processing is implemented, as a matter of course, the manual mechanical scanning is implemented continuously, thus the output data of the line image sensor 34 passes through the data lines (D6 and D5), to be written on the line memory 2 (LM2) while being specified address by the address lines (A2 and A4).

When the movement distance encoding circuit generates third pulse before the memory capacity of the line memory 2 (LM2) comes to be filled up, writing of the output data of the line image sensor 34 is switched to the line memory 1 (LM1) again, thus transferring of ten lines data starts from the line memory 2 (LM2) to the frame memory (FM) 33. Namely, when the third pulse is inputted, interruption occurs in the microprocessor unit (MPU) 38. The circuit is switched based on this operation. The signal demultiplexer (DMX) 36 selects the data line (D4), the selector 1 (SEL1) selects the address line (A2), the selector 2 (SEL2) selects the address line (A1), and the data selector (DS) 43 selects the data line (D5). Further, the address counter 39 is returned to "0", thus starting the count synchronized with driving of the image sensor 34. The value of the address counter 39 is taken in the MPU 38 through the decoder (DCRD) 37, based on this operation, the MPU 38 transfers the data with high velocity from the line memory 2 (LM2) to the frame memory (FM) 33 such that ten lines data of the data written in the line memory 2 (LM2) come to be even interval. Simultaneously, the output data of the line image sensor 34 passes through the data lines (D6 and D4) causing the address to be specified by the address lines (A2 and A3) while being written in the line memory 1 (LM1).

The image data of input manuscript is accumulated in the frame memory (FM) 33 by repeating the procedure of the same kind.

When the manual mechanical scanning velocity slows down or being stopped, the line memory 1 (LM1) or the frame memory 2 (LM2) which stores the data of the line image sensor 34 comes to be filled up. Namely, the line counter (COUNT) 39 counts maximum address of the line memory 1 (LM1) or the line memory 2 (LM2). In this case, the interrupt signal is generated in relation to the microprocessor unit (MPU) 38. When the address value which is acquired through the decoder (DCRD) 37 corresponds to the maximum address of the line memory 1 (LM1) or the line memory 2 (LM2), based upon the interrupt signal, program is terminated as termination of the scanning.

On the other hand, when the manual mechanical scanning velocity is above over, less than 10 lines data exist in the line memory 1 (LM1) or the line memory 2 (LM2), thus it is managed in such away that the whole line data of the line memory 1 (LM1) or the line memory 2 (LM2) is transferred to frame memory (FM). As a result this is the same phenomenon that there occur in the conventional manual mechanical scanning type image input apparatus read error with jumping line data.

According to the above described embodiment, since the manual mechanical scanning velocity can be regarded as the constant velocity within the minute-range, unnecessary resolution of the movement distance encoding circuit is eliminated to introduce resolution of 1/N, thus the line data between pulses of the movement distance encoding circuit comes to be extracted with even interval. Thereby, the movement distance encoder is miniaturized, termination of manual mechanical scanning can be detected automatically, it is capable of following the fluctuation of the manual mechanical scanning velocity, and it is capable of inputting image with resolution equal to the conventional resolution.

Besides, although the above described embodiment is one preferred embodiment of the present invention, the invention is not restricted by the embodiment, various modifications are capable of being implemented within the limit which does not deviate from the gist of the present invention. For example, in the above described embodiment, the output data of the line image sensor is stored in the line memories (LM1), (LM2) temporarily. However, it is proper that there is no such memory. Namely, it is proper that an image data to be read is constructed in such a way that it causes the image data to continuously read directly to the frame memory possessing far greater capacity than the image data of the manuscript to be read, thus storing whole the time of signal generation of the movement distance encoder. It causes the N line data to extract from the generated pulses of the respective movement distance encoding circuit after termination of the manual mechanical scanning, thus thinning out unnecessary data which is not extracted.

As clarified above, in the manual scanning type image input apparatus and image signal processing method according to the present invention, which apparatus reads the image data of the required manuscript by implementing the electrical main scanning with predetermined driving period, thus detecting movement distance in the direction of mechanical auxiliary scanning of reading. The image data is constructed in such a way that the line image data which is read is stored temporarily, the line image data which is stored temporarily is read out selectively, and it causes the image data to construct from the line image data which is selected to be read out based upon the address of the line image data. Consequently, it becomes capable of constructing the image data of the required manuscript without slipping off based upon the mechanical auxiliary scanning with equal velocity, by virtue of the fact that it causes the whole line image data which is read to store temporarily, before causing the stored line image data to read out while thinning out based upon the movement distance.

Further, it causes the line image data which is read to distribute to either one of the two systems, before the distributed line image data is stored temporarily in the respective two systems, thus processing of image data with high velocity comes into facility.

When it requires the resolution of R-line/mm in the direction of the mechanical auxiliary scanning in relation to the image data to be constructed above, movement distance encoding is carried out with the resolution of more than R/N-line/mm, thus setting the image data which is thinned out to be read N-line with equal interval. It is capable of miniaturizing the movement distance encoder while setting resolution to 1/N.

Further, when new detection does not occur within the predetermined time period from the movement distance encoding, it is capable of detecting termination of the manual mechanical auxiliary scanning automatically by implementing termination processing of reading.

While preferred embodiments of the invention have been described using specific terms, such description is for illustrative purpose only, and it is to be understood that changes and variations may be made without departing from the spirit or scope of the following claims.

What is claimed is:

1. A manual scanning type image input apparatus comprising:
   a line image sensor for reading image data of a prescribed manuscript while implementing electrical main scanning with predetermined driving cycle;
   a movement distance encoding means for detecting movement distance in the direction of mechanical auxiliary scanning of said line image sensor;

a line memory for storing temporarily line image data which is read by said line image sensor;

a data selector connected to said line memory for reading selectively said line image data which is stored temporarily in said line memory; and a decoder for constructing image data, based on an address of said line image data, from said line image data selected by said data selector, wherein said line memory temporarily stores therein the whole line image data outputted from said line image sensor, before said data selector reads out said whole line image data which is stored in said line memory while thinning out said stored whole line image data based on said movement distance.

2. A manual scanning type image input apparatus as claimed in claim 1, further comprising:

distribution means for distributing said line image data which is read by said line image sensor to either one of two systems, wherein said line memory is constituted by one-set including two memories each of which is connected to either one of said two systems to store said line image data temporarily.

3. A manual scanning type image input apparatus as claimed in claim 1, wherein when said image data which is constructed requires resolution of R-line/mm in the direction of said mechanical auxiliary scanning, said movement distance encoding means possesses resolution of R/N-line/mm, thus setting said image data which is thinned out to read to N lines image data with equal interval.

4. A manual scanning type image input apparatus as claimed in claim 3, wherein when a new detection does not occur within a predetermined time period in said movement distance encoding means, it implements termination processing of said reading.

5. A manual scanning type image input apparatus as claimed in claim 1, further comprising a frame memory which stores the thinned out image data read out by said data selector.

6. An image signal processing method comprising the steps of:

a line image data reading step for reading an image data of a prescribed manuscript while implementing electrical main scanning with predetermined driving cycle;

a movement distance encoding step for detecting movement distance in the direction of mechanical auxiliary scanning of said line image sensor;

a storing step for storing temporarily line image data which is read by said line image sensor;

a selective reading step for reading selectively said line image data which is stored temporarily; and an image data constructing step for constructing image data based on an address of said line image data form said line data selected by said data selector, wherein the whole line image data read by said line image data reading step is stored temporarily, before selective reading step reads out said line image data which is stored temporarily, and wherein said selective reading step reads out said line image data which is stored temporarily while thinning out said stored line image data based on said movement distance.

7. An image signal processing method as claimed in claim 6, wherein when said image data which is to be constructed requires resolution of R-line/mm in the direction of said mechanical auxiliary scanning, said movement distance encoding step is executed of resolution of R/N-line/mm, thus setting said image data which is thinned out to read to N lines image data with equal interval.

8. An image signal processing method as claimed in claim 7, wherein when a new detection does not occur within a predetermined time period in said movement distance encoding step, it implements termination processing of said reading.

9. An image signal processing method as claimed in claim 6, further comprising the steps of:

a distribution step for distributing said line image data which is read at said line image data reading step to either one of two systems, wherein said storing step stores said line image data which is distributed in respective said two systems temporarily.

10. A manual scanning type image input apparatus comprising:

a line image sensor which reads image data of a prescribed manuscript while implementing electrical main scanning with predetermined driving cycle;

a movement distance encoder which detects movement distance in the direction of mechanical auxiliary scanning of said line image sensor;

a line memory which temporarily stores line image data which is read by said line image sensor;

a data selector connected to said line memory which selectively reads said line image data which is stored temporarily in said line memory; and a decoder which constructs image data, based on an address of said line image data, from said line image data selected by said data selector, wherein, when a new detection occurs in said movement distance encoder, said line memory temporarily stores therein the whole line image data outputted from said line image sensor, and said data selector reads out said whole line image data which is stored in said line memory, while thinning out said stored whole line image data based on said movement distance.

* * * * *